US006636100B1

(12) United States Patent
Shingaki

(10) Patent No.: US 6,636,100 B1
(45) Date of Patent: Oct. 21, 2003

(54) CAN CONTROLLER AND ONE-CHIP COMPUTER HAVING A BUILT-IN CAN CONTROLLER

(75) Inventor: Yasunori Shingaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,476

(22) Filed: Nov. 29, 1999

(30) Foreign Application Priority Data

Jun. 29, 1999 (JP) .......................................... 11-184291

(51) Int. Cl.$^7$ .............................................. H03K 17/16
(52) U.S. Cl. ....................... 327/388; 327/141; 327/518; 714/731
(58) Field of Search ................................ 327/141, 142, 327/379, 387, 388, 518; 375/288; 714/43, 4, 724, 731; 370/241, 242, 245, 458, 463, 474, 908

(56) References Cited

U.S. PATENT DOCUMENTS

| 5,001,642 A |   | 3/1991  | Botzenhardt et al. ........ 701/115 |
| 5,105,441 A |   | 4/1992  | Borst et al. ................. 375/288 |
| 5,111,460 A |   | 5/1992  | Botzenhardt et al. ......... 714/57 |
| 5,216,674 A |   | 6/1993  | Peter et al. .................... 714/43 |
| 5,280,482 A | * | 1/1994  | Kitamura et al. ........... 370/458 |
| 5,357,518 A |   | 10/1994 | Peter ........................... 714/4 |
| 5,412,663 A |   | 5/1995  | Kromer et al. ............. 714/724 |
| 5,448,180 A |   | 9/1995  | Kienzler et al. ............... 326/15 |
| 5,448,561 A |   | 9/1995  | Kaiser et al. ................ 370/471 |
| 5,499,336 A |   | 3/1996  | Preis et al. .................. 482/133 |
| 5,524,213 A |   | 6/1996  | Dais et al. ................... 709/207 |
| 5,539,778 A |   | 7/1996  | Kienzler et al. ............ 375/317 |
| 5,748,616 A | * | 5/1998  | Riley ........................ 370/242 |
| 6,212,197 B1 | * | 4/2001  | Christensen et al. ........ 370/463 |

FOREIGN PATENT DOCUMENTS

| DE | 3506118     | 8/1986  |
| DE | 3546662     | 8/1986  |
| DE | 3546664     | 8/1986  |
| DE | 3546683     | 8/1986  |
| DE | 3546684     | 8/1986  |
| DE | 3719283     | 12/1988 |
| DE | 3722415     | 1/1989  |
| DE | 3826774     | 2/1990  |
| DE | 3927968     | 2/1991  |
| DE | 3928537     | 3/1991  |
| DE | 4129205     | 1/1992  |
| DE | 4108610     | 9/1992  |
| DE | 4108709     | 9/1992  |
| DE | 4131133     | 4/1993  |
| DE | 42 13 134   | 10/1993 |
| JP | 3-171234    | 7/1991  |
| JP | 7-152451    | 6/1995  |
| WO | WO 90/09631 | 8/1990  |
| WO | WO 90/09713 | 8/1990  |

OTHER PUBLICATIONS

Bosch, "8 Bit Timing Requirements", Part A, pp. 27 and 29, Sep. 1991.

* cited by examiner

Primary Examiner—Minh Nguyen
(74) Attorney, Agent, or Firm—Burns, Doane, Swecker & Mathis, LLP

(57) ABSTRACT

A CAN controller is equipped with a control circuit that can control whether or not an edge detection signal of a serial signal (CRX input) that is detected by an edge detection circuit is to be input to a re-synchronization circuit causing the execution of a re-synchronizing function prepared in accordance with a CAN protocol. The re-synchronizing function can be made ineffective by inputting into a control signal the control circuit. As a result, the state of synchronization of the CRX input that occurs due to the re-synchronizing function ceases to fluctuate. Therefore, in the CAN controller, a test can be performed with a high speed and stably and without being influenced by the execution of the re-synchronizing function.

3 Claims, 5 Drawing Sheets

CAN CONTROLLER AND ONE-CHIP COMPUTER HAVING A BUILT-IN CAN CONTROLLER

FIELD OF THE INVENTION

The present invention relates to a CAN controller and a one-chip computer having the built-in CAN controller, each of which enables the operation test thereof to be executed stably at a high speed. More particularly, this invention relates to a CAN controller and a one-chip computer having the built-in CAN controller, each of which only when the operation test thereof is performed is prevented from being influenced by the operation of its re-synchronizing function.

BACKGROUND OF THE INVENTION

With a recent spread of personal computers, establishment of a network build-up technology such as a client server system, and complete arrangement and adjustment of a communication infrastructure, the introduction of a network computing has proceeded not only on an enterprise level but also on a person level. The network computing that is represented by the Internet or a LAN (Local Area Network) in general is mainly intended to perform the exchange of information between people smoothly and over a wide range.

Also, in the field of industry, in a FA (Factory Automation), etc., the pieces of control equipment that have been functionally dispersed and had their dispositions dispersed are conventionally being unitarily controlled and managed by a network to thereby achieve the optimization of the production activity. For example, attention has been drawn toward a CIM (computer integrated manufacturing system) as a computer system that inclusively unifies individual technical data pieces and production data pieces such as a CAD (computer-aided design), CAM (computer-aided design), CAE (computer-aided design), assembling, and examination, and further even a production plan and production management.

It is very useful to introduce the network computing, in this way, with respect to the operations that are to be performed under a common object or common circumstances, especially, with respect to the processing form in which the cooperative operations are needed between a plurality of equipment pieces. In this view, even in case of the automobiles, the added value and function of which have yearly been increased, there has been demanded a system that unitarily controls and manages respective electrified units, which have been electronically controlled, through a network. Especially, the introduction of a CAN (Controller Area Network) that is an on-vehicle LAN standard has proceeded.

The CAN is a protocol that has been internationally standardized as an ISO 11898. It adopts a serial communication system that replaces a differential voltage between two lines called "CAN buses" with a digital value of 0/1 and that uses the resulting signal as a transmission and reception signal. It therefore has a high resistance to noise and makes it possible to set its transmission rate up to 1 Mbps at maximum. It therefore characteristically enables a very highly reliable and highly speedy network control to be performed even when compared to the conventional communication system.

Ordinarily, a CAN controller is loaded on each of the above-described respective electrified units (each hereinafter called "a CAN node") that have been connected to the CAN buses. The data transmission and reception between the CAN nodes that are made through the use of the CAN buses as an intermediary can be performed with this CAN controller. Especially, the CAN controller characteristically has an abnormality detecting function on the network and a re-synchronizing function thereon to thereby achieve the stabilization of the communication.

Further, the CAN is a bus system that has multi master ability. Therefore, every CAN node can transmit data onto the CAN buses and a plurality of CAN nodes can receive the signal on the CAN buses simultaneously. In this CAN network, it is not necessary, in principle, to set a so-called "apparatus address" ("station ID"). Instead, the content of the message is represented by an ID (a message ID) that has been added to each piece of message data to be transmitted.

This message ID is also referred to when determining the priority when bus accesses from a plurality of CAN nodes have competed. Only the message from the CAN node that has won a victory out of the communication mediation as a result of the line scramble appears on the buses. And the CAN controller that has been loaded on each CAN node determines according to this message ID whether or not the message should be formally taken in.

Ordinarily, the CAN controller is supplied in the form of a chip so as to exhibit the function that has been included therein in accordance with the CAN protocol. It therefore serves as an interface between the CPU that is loaded on the CAN node and the CAN buses. Further, by making this CAN controller into a module, the CAN controller is also supplied in actuality in the form of a one-chip microcomputer having the CAN controller built-in.

The CAN is originally developed for the purpose of being used in an automobile as mentioned above. However, by taking advantage of the characterizing features thereof that the amount of wiring is reduced; the weight and cost are resultantly reduced; the real-time performance is high; and the strength against the electrical interference is high, the CAN is also adopted in the built-up of the above-described FA, medical equipments, or ships.

In the above-explained CAN controller or one-chip microcomputer (hereinafter called "a CAN chip") having the CAN controller built-in, the signal is delayed due to the signal processing circuits disposed between the CRX terminal that receives a serial signal from the CAN buses and the CAN module that is actually exhibitive of various kinds of their functions that have been included therein in accordance with the CAN protocol. Therefore, the signal that is received by the CAN module is delayed with respect to the signal received in the CAN buses. In addition, there is a delay that occurs due to the transmission cable from the transmission node to the reception node. The above-described re-synchronizing function operates in order to compensate for these signal propagation delays.

However, in the manufacturing process of the above-described CAN chip, when testing the operation of the CAN module section, the above-described delay in the signal propagation fluctuates depending on the testing conditions such as the environmental temperature and the applied voltage, and, according to each of these fluctuations, the re-synchronizing function is inconveniently executed. Therefore, there is the problem that the stable and speedy test in a stationary state of synchronization was inconveniently hindered.

This problem involves therein the possibility that, especially, with respect to a normal CAN chip, the test result indicating that a CAN chip is defective may inconveniently be output even in a case where a serial testing signal is input to an input terminal (hereinafter called "a CRX terminal") having a serial signal input thereto from the CAN buses with a timing that is determined on a basis of, for example, an internal clock signal.

It is indeed possible to prepare test vectors for each fluctuating testing condition and repeat a test that corresponds to each of such test vectors. However, such test vectors become huge in number. On the other hand, it is difficult to predict or estimate the fluctuation of the testing conditions. Therefore, this solution is not a realistic one.

The above-described problem will be explained with reference to the drawing. FIGS. 5A and 5B are explanatory views illustrating the occurrences of a bit timing in the conventional CAN controller. Especially, FIG. 5A illustrates the exhibition of the re-synchronizing function with respect to first testing conditions while FIG. 5B illustrates the exhibition of the re-synchronizing function with respect to second testing conditions.

In the CAN, a length of time that is called "a bit time" is allotted to each of the respective bits that constitute the above-described message (message frame). This bit time is constructed of four segments of a Synchronization Segment (hereinafter called "SyncSeg"), a Propagation Segment (hereinafter called "PrSeg"), a Phase Segment 1 (hereinafter called "PhSeg1"), and a Phase Segment 2 (hereinafter called "PhSeg2"). Further, each segment is constructed of a prescribed number of time-dividing units. This time-dividing unit is hereinafter represented by Tq (Time quantum).

It is to be noted that 1 Tq is produced by a clock that is given from outside the CAN chip and in the specification of the CAN protocol it is defined that SyncSeg=1 Tq.

In the bit time illustrated in FIGS. 5A and 5B, it is set that PrSeg=3 Tq, PhSeg1=2 Tq, and PhSeg2=2 Tq, whereby illustration is made of a case where each bit, i.e., 1 bit is constructed of the sum total of 8 Tqs that is composed of these 7 Tqs plus 1 Tq that is SyncSeg.

In a case where the bit edge of a serial signal (hereinafter called "a CRX input") that is input from a CRX terminal is detected within the SyncSeg time period, or a time period (the Tq [P2] of PrSeg in FIG. 5A) that is prepared by adding a SJW (Synchronization Jump Width) that is set as 1 Tq to this SyncSeg, namely, in a case where an ideal bit edge containing no delay therein is detected, synchronization is started determining the Tq corresponding to the location of this bit edge as SyncSeg. Thereafter, the value that is indicated by the CRX input at a point in time when 3 Tqs of PrSeg plus 2 Tqs of PhSeg1 have elapsed, i.e., at a bordering point in time ([Sampling Point] in the figure) between the PhSeg1 and the PhSeg2 is procured as bit data.

Also, in a case where, as illustrated in FIG. 5A, because of the delay of the CRX input under the first testing conditions, the bit edge of the CRX input is detected during the Tq [P1] of the PrSeg that immediately succeeds the time period that consists of the SyncSeg and the SJW added thereto, namely, in a case where an internal delay D1 has occurred, the re-synchronizing function of the CAN controller automatically works. As a result, a Tq next to the Tq [P1] of the PrSeg corresponding to the location of the detected bit edge is newly set as the starting Tq [P2] of the PrSeg, whereby the synchronization is made to persist.

Namely, as a result of this, re-synchronization is achieved. And the value that is indicated by the CRX input at the Sampling Point that thereafter comes is procured as bit data. Accordingly, in this case, the result is that the PreSeg is prolonged by 2 Tq from the initial SyncSeg.

Next, in a case where, as illustrated in FIG. 5B, because of the delay of the CRX input under the second testing conditions, the bit edge of the CRX input is detected during the Tq [P0] of the PrSeg that immediately succeeds the time period that consists of the SyncSeg and the SJW added thereto, namely, in a case where an internal delay D2 has occurred, also, as in the case of the above, by the re-synchronizing function of the CAN controller, a Tq next to the Tq [P0] of the PrSeg is newly set as the starting Tq [P2] of the PrSeg, whereby re-synchronization is achieved. Accordingly, in this case, the result is that the PreSeg is prolonged by 3 Tq from the initial SyncSeg.

In the FIGS. 5A and 5B explained above, depending on the testing conditions, a difference in the internal delays occur under the respective testing conditions. Resultantly, through the performance of the re-synchronizing function, a delay difference DE that is the difference portion between these internal delays appears as the difference in the prolonged amount of Tq between these internal delays.

In the actual use form of the CAN controller, the execution of the re-synchronizing function due to such internal delays is indeed effective as a performance of enhancing the reliability on the communication. However, as stated above, while testing a CAN chip, the above-described change in state of synchronization of the CRX input is inconveniently observed as a delay of the Ack signal transmission or the error flag. This inconveniently hinders the execution of the test. Further, the shorter the time quantum Tq becomes, namely, the more speedily the test is executed, the greater the adverse effect of the delay becomes relatively. Therefore, the stable execution of the test becomes difficult.

SUMMARY OF THE INVENTION

The present invention is made in order to solve the above-described problems. It is an object of this invention to provide a CAN controller and a one-chip computer having the CAN controller built-in, which during testing enable the test to be performed with a high speed and stably without being influenced by the execution of the re-synchronizing function.

According to this invention, there is provided the control unit that can control whether or not the edge detection signal of the serial signal that is detected by the edge detection unit is to be input to the re-synchronization unit for causing a re-synchronizing function prepared in accordance with a CAN protocol to be executed. Therefore, it is possible to make ineffective the re-synchronizing function performed by the re-synchronization unit according to the input of the control signal that performs this control operation.

According to this invention, when the control unit inputs the control signal indicating a test mode, the edge detection signal that is output from the edge detection unit is not output to the re-synchronization unit. Therefore, when performing the operation test of the CAN controller, it is possible to make the re-synchronizing function ineffective.

According to this invention, the control unit is constructed of only one AND gate and only one inverter. Therefore, it is possible to simplify the circuit construction.

According to this invention, there is provided between the CAN module and the signal processing circuit for performing various processing such as elimination of noises with respect to the serial signal input via the CAN buses the selecting unit that inputs the signal (first signal) that is output from the signal processing unit and the serial signal (second signal) that has bypassed the signal processing circuit, and that inputs to the CAN module either one of the first signal and the second signal. It is therefore possible to select the serial signal input to the CAN module according to the input of the control signal for performing such selection.

According to this invention, when the selecting unit inputs the control signal indicating a test mode, the selecting unit can input the serial signal that does not pass through the signal processing unit, directly from the CRX terminal. Therefore, when performing the operation test of the CAN controller, it is possible to decrease the propagation delay of the serial signal that is caused to occur due to the signal processing unit.

According to this invention, the selecting unit is constructed of only one inverter and only two clocked inverters. It is therefore possible to simplify the circuit construction.

According to this invention, even when propagation delay has occurred during a time period that lapses until the serial signal that has input from the CRX terminal actually reaches the CAN module, if the frequency of the second clock signal is small enough to absorb this propagation delay, it is possible, by selecting this clock, to prevent the change in the propagation delay that occurs depending on the testing conditions from having an effect on the CAN module.

According to this invention, when the clock switching unit inputs the control signal indicating a test mode, the serial signal that is input from the CRX terminal is synchronized according to the second clock signal whose frequency is smaller than that of the first clock signal that is used in the ordinary operation, and this serial signal is transmitted to the CAN module. Therefore, it is possible to prevent the propagation delay from having an effect on the CAN module.

According to this invention, the selecting unit is constructed only of one inverter, two clocked inverters, and one D flip flop. Therefore, it is possible to simplify the 1S circuit construction.

According to this invention, there is provided the internal communication unit that, between at least two CAN modules of the plurality of CAN modules, generates signals corresponding to serial signals input from a CAN bus on the basis of the serial signals that are output from the respective CAN modules to the CAN bus, and that inputs the generated signal to the respective CAN modules as the serial signal that is input from the CAN buses. Therefore, it is possible to perform the communication between the CAN modules in the interior of the CAN controller without using the CAN buses as an intermediary.

According to this invention, when the internal communication unit inputs the control signal which indicates a testmode, it is possible to perform the communication between the CAN modules in the interior of the CAN controller without using the CAN buses as an intermediary. Therefore, when performing the operation test of the CAN controller, it is possible, in place of the serial signal that is input from the CAN buses in the ordinary operation, to input the signal that is generated according to the respective serial signals output from the respective CAN modules, to these respective CAN modules.

According to this invention, the internal communication unit is only constructed of one NAND gate, one inverter, and three-state buffer. Therefore, it is possible to simplify the circuit construction. Simultaneously, it is possible, with respect to the CAN controller whose dominant level based on the CAN protocol is set as a logical level of "L", to perform the communication between the CAN modules inside this CAN controller according to the control signal.

According to this invention, the internal communication unit is only constructed of one NOR gate, one inverter, and three-state buffer. Therefore, it is possible to simplify the circuit construction. Simultaneously, it is possible, with respect to the CAN controller whose dominant level based on the CAN protocol is set as a logical level of "H", to perform the communication between the CAN modules inside this CAN controller according to the control signal.

According to this invention, in the one-chip computer that has built-in the CAN controller according to any one of above inventions added as an on-chip form, also, the function that is brought about by this CAN controller can be given.

Other objects and features of this invention will become apparent from the following description with reference to the accompanying drawings.

DESCRIPTION OF THE PREFERRED EMBODIMENTS

Embodiments of a CAN controller and a one-chip computer having a CAN controller built-in according to the present invention will now be explained in detail with reference to the drawings. It is to be noted that the present invention is not limited to these embodiments.

Figure 1:
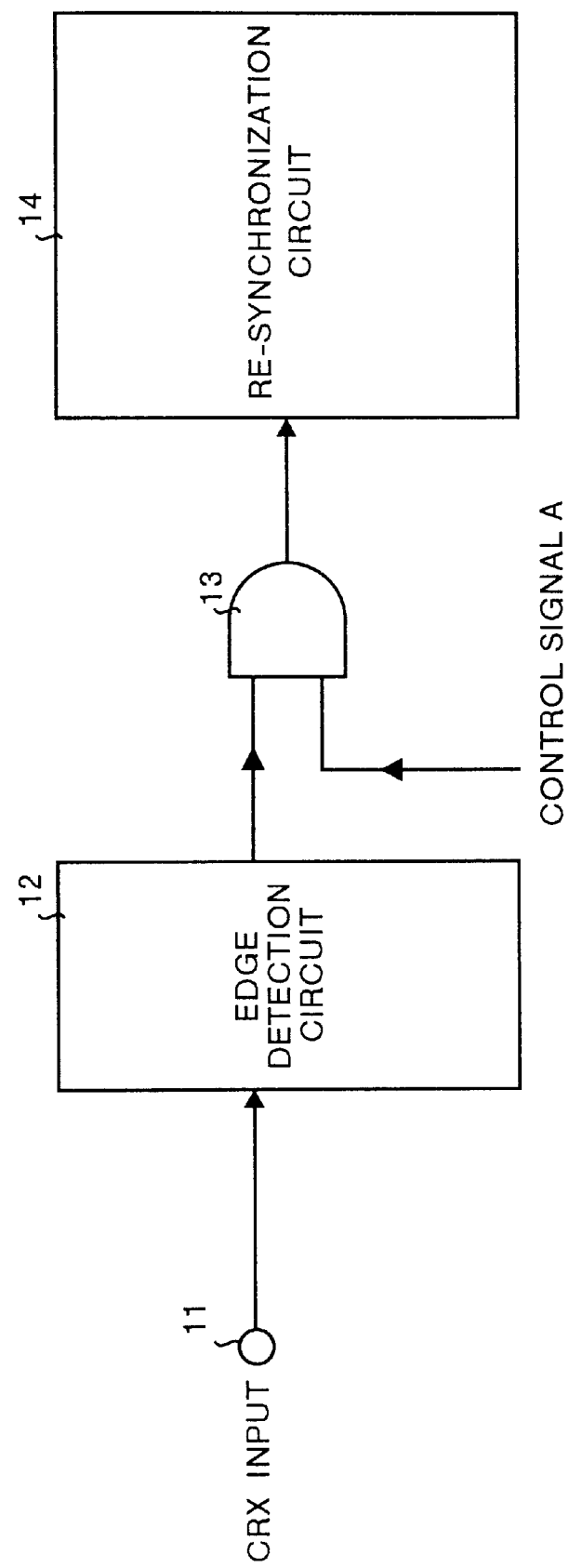
FIG. 1 is a block diagram illustrating a schematic construction of a part of a CAN module inside a CAN controller according to a first embodiment of the present invention.

First, a CAN controller and a one-chip computer having a CAN controller built-in according to a first embodiment of the present invention will hereafter be explained in detail. FIG. 1 is a block diagram illustrating a schematic construction of a part of a CAN module inside the CAN controller according to the first embodiment.

Especially, FIG. 1 illustrates a portion of the CAN module of the CAN controller, which is composed of a re-synchronization circuit 14 that is exhibitive of its re-synchronizing function and an edge detection circuit 12 for detecting the bit edge of a CRX input that becomes necessary in the re-synchronization circuit 14. Various kinds of other functional circuits in accordance with the CAN protocol have not been illustrated in this figure.

The characterizing feature of the CAN controller according to this first embodiment is that, as illustrated in FIG. 1, between the edge detection circuit 12 and the re-synchronization circuit 14, there is provided a control circuit 13 that can make a control of whether or not the edge detection signal that is output from the edge detection circuit 12 is to be input to the re-synchronization circuit 14.

Here, an AND gate is used as the control circuit 13. The edge detection signal that is output from the edge detection circuit 12 is input to one input terminal of this AND gate. And a signal that is output from the AND gate is input to the re-synchronization circuit 14. Accordingly, it is possible to control whether or not the edge detection signal output from the edge detection circuit 12 is to be input to the re-synchronization circuit 14 as is, according to the level of a control signal A that is input to the other input terminal of the AND gate.

Concretely, when a signal having a logical level of "H" is input as the control signal A, a signal having the same logical level as that of the edge detection signal that is output from the edge detection circuit 12 is output from the AND gate. Therefore, this way of operation becomes equivalent to that in a state where the output of the edge detection circuit 12 is directly connected to the input of the re-synchronization circuit 14 as in the conventional way of operation.

On the other hand, when a signal having a logical level of "L" is input as the control signal A, a signal having a logical level of "L" is at all times output from the output terminal of the AND gate independently of the edge detection signal that is output from the edge detection circuit 12. Therefore, the re-synchronization circuit 14 cannot recognize the generation of a bit edge at the CRX input. It is to be noted that the edge detection circuit 12 in this case is assumed to be a one shot multivibrator that outputs 1 pulse as the edge detection signal.

Accordingly, when performing the test of this CAN controller, by inputting a signal having a logical level of "L" to the AND gate constituting the control circuit 13 as the control signal A, it is possible to make the re-synchronization function unworkable. Namely, it becomes impossible that the state of synchronization of the CRX input will fluctuate due to the re-synchronizing function in units of testing conditions. It is thus possible to perform the test with a high speed and stably.

Incidentally, the AND gate explained above in many cases is actually constructed as a CMOS logic circuit by directly connecting a NAND gate and an inverter. Also, the construction illustrated in FIG. 1 can not only be applied to the CAN controller but also be similarly applied to a one-chip computer having a CAN controller built-in. Especially, the higher in performance the chip becomes due to the provision of various kinds of signal processing circuits between the CAN module and the CRX terminal 11, the more remarkable the effect becomes.

As explained above, in the CAN controller and the one-chip computer having the CAN controller built-in according to the first embodiment, within the CAN module, between the edge detection circuit 12 and the re-synchronization circuit 14, there is provided the control circuit 13 that controls whether or not the edge detection signal output from the edge detection circuit 12 is to be transmitted to the re-synchronization circuit 14. Therefore, when performing the operation test of the CAN module (excluding the test of the re-synchronizing function), it is possible to make the re-synchronizing function unworkable by inputting to this control circuit 13 the control signal A that indicates interrupting the input of the edge detection signal to the re-synchronization circuit 14. It is thus possible to execute the stable and highly speedy test.

Figure 2:
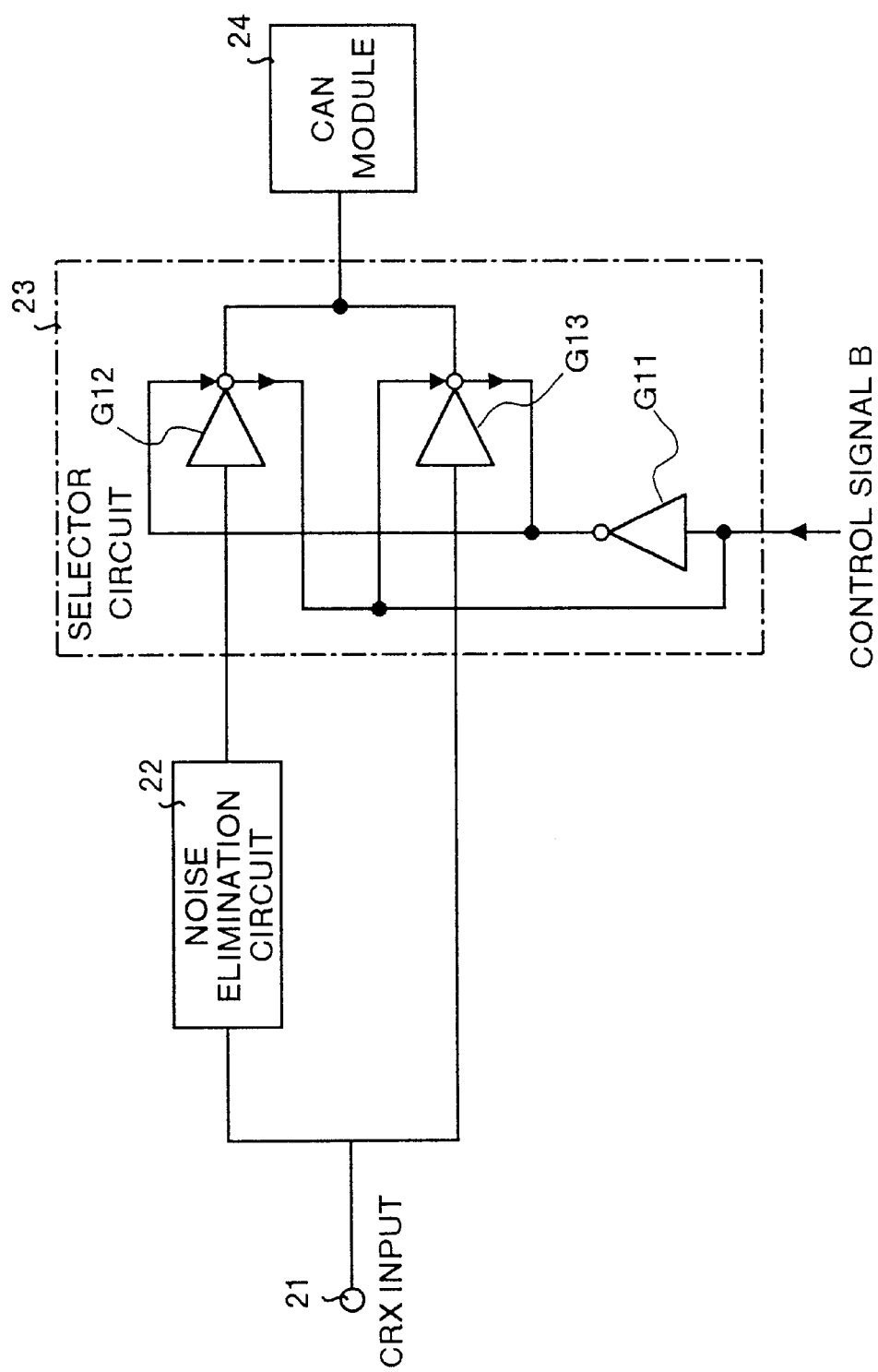
FIG. 2 is a block diagram illustrating a schematic construction of a part of an interior of a CAN controller according to a second embodiment of the present invention.

Next, the CAN controller and the one-chip computer having the CAN controller built-in according to a second embodiment of the present invention will be explained. FIG. 2 is a block diagram illustrating a schematic construction of a part of the interior of the CAN controller according to the second embodiment.

Especially, FIG. 2 illustrates a portion of the internal construction of the CAN controller, which is composed of a CAN module 24 and a noise elimination circuit 22 disposed between the CRX terminal and the CAN module 24. Other circuits wherein the CAN controllers are have been omitted.

The characteristic feature of the CAN controller according to this second embodiment is that, as illustrated in FIG. 2, between the noise elimination circuit 22 and the CAN module 24, there is provided a selector circuit 23 that can make a control of whether or not, regarding the signal that is input to the CAN module, the CRX input that is output from the noise eliminating circuit 22 is to be input to the CAN module 24, or the CRX input that is input to the CRX terminal 21 is to be directly input to the CAN module 24.

As shown in FIG. 2, the selector circuit 23 is constructed of one inverter G11 and two clocked inverters G12 and G13. An input terminal of the inverter G11 receives a control signal B that indicates the selection control made in this selector circuit 23. The input terminal thereof also is connected to a second clock input terminal of the clocked inverter G12 and a first clock input terminal of the clocked inverter G13.

Also, an output terminal of the inverter G11 is connected to a first clock input terminal of the clocked inverter G12 and a second clock input terminal of the clocked inverter G13. And to an input terminal of the clocked inverter G12 is input a signal that is output from the noise elimination circuit 22. To an input terminal of the clocked inverter G13 is directly input the CRX input that is input to the CRX terminal 21. On the other hand, output terminals of the clocked inverters G12 and G13 are connected to each other and input a signal that is output from these output terminals to the CAN module 24.

Next, the operation of this selector circuit 23 will be explained. First, upon input of a signal having a logical level of "L" as the control signal B, a signal having a logical level of "H" is output from the inverter G11. In this state, the clocked inverter G12 functions as an ordinary inverter, and the output terminal of the clocked inverter G13 is brought to a state of high impedance. Therefore, only the signal from the noise elimination circuit 22 that is input to the clocked inverter G12 is input to the CAN module 24.

On the other hand, upon input of a signal having a logical level of "H" as the control signal B, a signal having a logical level of "L" is output from the inverter G11. In this state, the output terminal of the clocked inverter G12 is brought to a state of high impedance and the clocked inverter G13 functions as an ordinary inverter. Therefore, only the CRX input that is directly input to the clocked inverter G13 is input to the CAN module 24.

However, from the above-described selector circuit 23, a signal whose phase is inverted with respect to the phase of the CRX input is output. Therefore, it may be arranged to further provide an inverter in the output portion of the selector circuit 23 and input the output of this inverter to the CAN module 24.

Incidentally, in FIG. 2, illustration has been made of only the noise elimination circuit 22 causing a relatively large magnitude of propagation delay to occur alone, as the signal processing circuit that is interposed between the CRX terminal 21 and the selector circuit 23. However, even when other signal processing circuits such as a Schmidt circuit or various circuits are interposed, it is possible to obtain the same effect.

Further, it is needless to say that the construction illustrated in FIG. 2 can of course be applied not only to the CAN controller but also to the one-chip computer having the CAN controller built-in.

As explained above, in the CAN controller and the one-chip computer having the CAN controller built-in according to the second embodiment, in a case where in the signal path covering from the CRX terminal 21 up to the CAN module 24 other circuits such as the noise elimination circuit 22 are provided, the selector circuit 23 in provided in this signal path that inputs to the CAN module 24 only either one of the final output signal of such other circuits, namely, the signal that is input to the CAN module 24 and the CRX input signal that is input to the CRX terminal 21. Therefore, when performing the operation test (excluding the test of the re-synchronizing function) of the CAN module, by inputting the control signal B indicating the test mode to this selector circuit 2i, it is possible to input the CRX input signal directly to the CAN module 24. As a result, the occurrence of the internal delay due to the above-described various circuits is decreased with the result that it becomes possible to execute the stable and highly speedy test.

Figure 3:
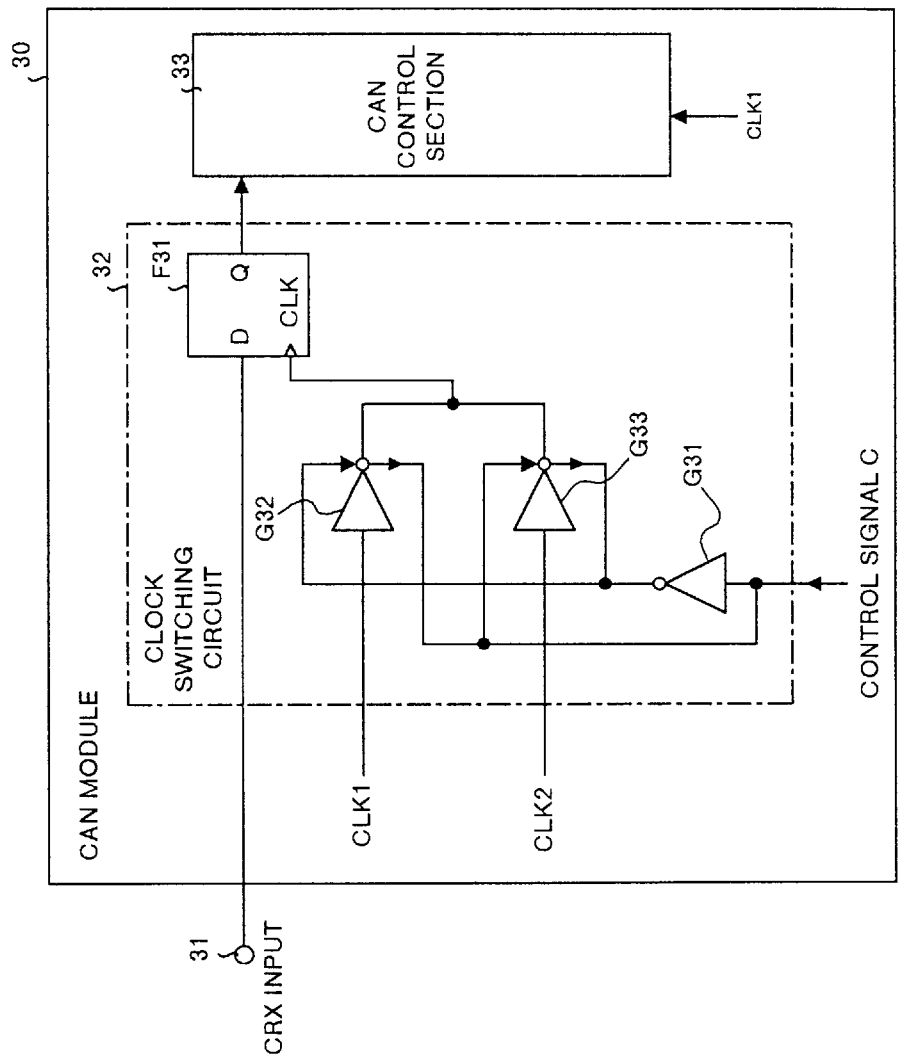
FIG. 3 is a block diagram illustrating a schematic construction of a part of an interior of a CAN controller according to a third embodiment of the present invention.

Next, the CAN controller and the one-chip computer having the CAN controller built-in according to a third embodiment of the present invention will be explained. FIG. 3 is a block diagram illustrating a schematic construction of a part of the interior of the CAN controller according to the third embodiment.

The characteristic feature of the CAN controller according to this third embodiment is that, as illustrated in FIG. 3, in the interior of the CAN module 30, between the CRX terminal 31 and a CAN control section 33, there is provided a clock switching circuit 32. The clock switching circuit 32 selects one from between a clock signal CLK1 that is used as a synchronizing clock signal when the ordinary operation is performed and a clock signal CLK2 that is sufficiently lower in frequency than the clock signal CLK1. Synchronization of the CRX input is performed according to the speed of the thus-selected clock signal, and the resulting synchronized signal is input to the CAN module.

As shown in FIG. 3, the clock switching circuit 32 is constructed of a D flip flop F31, an inverter G31, and two clocked inverters G32 and G33. The input terminal of the inverter G31 receives a control signal C that instructs the selection of a clock signal that is input to the D flip flop F31. This input terminal is also connected to a second clock input terminal of the clocked inverter G32 and a first clock input terminal of the clocked inverter G33.

Further, the output terminal of the inverter G31 is connected to a first clock input terminal of the clocked inverter G32 and a second clock input terminal of the clocked inverter G33. And to the input terminal of the clocked inverter G32 is input a clock signal CLK1 that is used as an ordinary synchronizing clock for synchronizing the CRX input signal. To the input terminal of the clocked inverter G33 is input a clock signal CLK2 that is used as a synchronizing clock for synchronizing the CRX input in the test mode. It is to be noted that it is assumed that this clock CLK2 is generated with a frequency lower than that with which the clock CLK1 is generated.

On the other hand, the output terminals of the clocked inverters G32 and G33 are connected to each other. The signals that have been output from these output terminals are input to the D flip flop F31 as a clock CLK. The data input terminal D of the flip flop F31 is connected to the CRX terminal 31 and receives the CRX input signal, which is output from a data output terminal Q according to the speed of the clock CLK. And the signal that is output from the data output terminal Q of the flip flop F31 is input to the CAN module 33.

Next, the operation of this clock switching circuit 32 will be explained. First, upon input of a signal having a logical level of "L" as the control signal C, a signal having a logical level of "H" is output from the inverter G31. In this state, the clocked inverter G32 functions as an ordinary inverter, and the output terminal of the clocked inverter G33 is brought to a state of high impedance. Therefore, the clock CLK1 that is input to the clocked inverter G32 is input to the D flip flop F31 as the clock CLK.

On the other hand, upon input of a signal having a logical level of "H" as the control signal C, a signal having a logical level of "L" is output from the inverter G31. In this state, the output terminal of the clocked inverter G32 is brought to a state of high impedance and the clocked inverter G33 functions as an ordinary inverter. Therefore, the clock CLK2 that is directly input to the clocked inverter G33 is input to the D flip flop F31 as the clock CLK.

It is to be noted that, needless to say, the construction illustrated in FIG. 3 can of course be applied not only to the CAN controller but also to the one-chip computer having the CAN controller built-in.

As explained above, in the CAN controller and the one-chip computer having the CAN controller built-in according to the third embodiment, there is provided the clock switching circuit 32 wherein the CRX input that is input to the CRX terminal 31 is input to the data input terminal D of the D flip flop F31; the signal that is output from the data output terminal Q thereof is newly input to the CAN control section 33 as the CRX input; and either one of the clock CLK1 that is ordinarily used and the clock CLK2 whose frequency is lower (whose speed is lower) than that of the clock CLK1 is selected as the clock CLK of the D flip flop F31. Therefore, when performing the operation test (excluding the test of the re-synchronizing function) of the CAN module, by inputting the control signal C indicating the test mode to this clock switching circuit 32, it becomes possible to slow down the speed of change (the speed of propagation) of the CRX input. Especially, by previously setting the clock CLK2 to a clock signal that is slow enough to absorb the propagation delay due to the above-described various circuits, the test can be stably performed even when the interior of the CAN module 30 is operated with a high speed.

Figure 4:
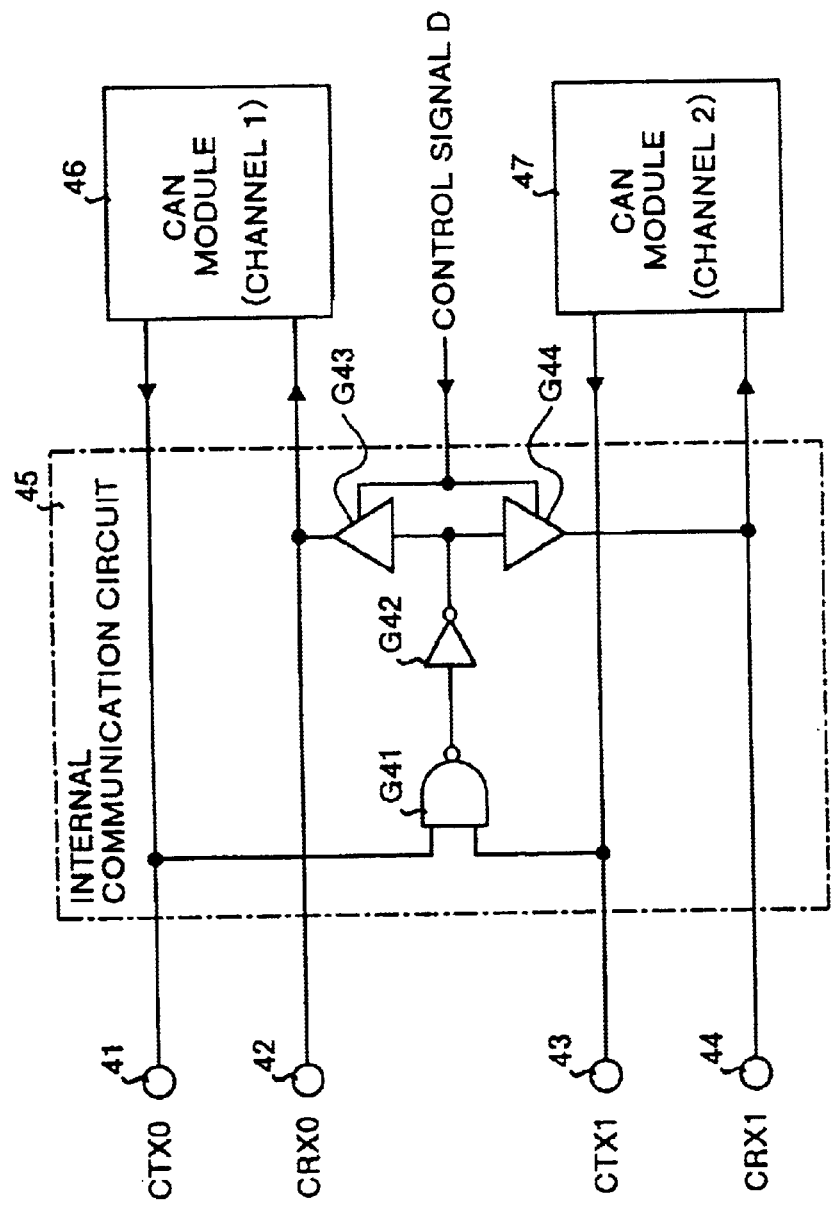
FIG. 4 is a block diagram illustrating a schematic construction of a part of an interior of a CAN controller according to a fourth embodiment of the present invention.
Figure 5A:
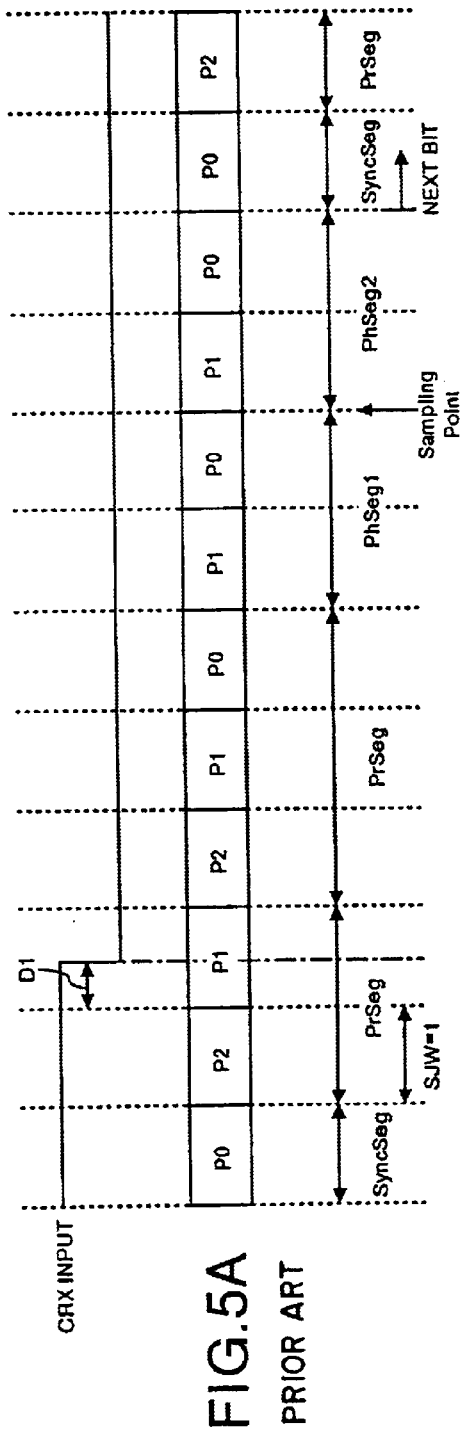
FIGS. 5A and 5B are explanatory views each illustrating the bit timing that prevails in a conventional CAN controller.
Figure 5B:
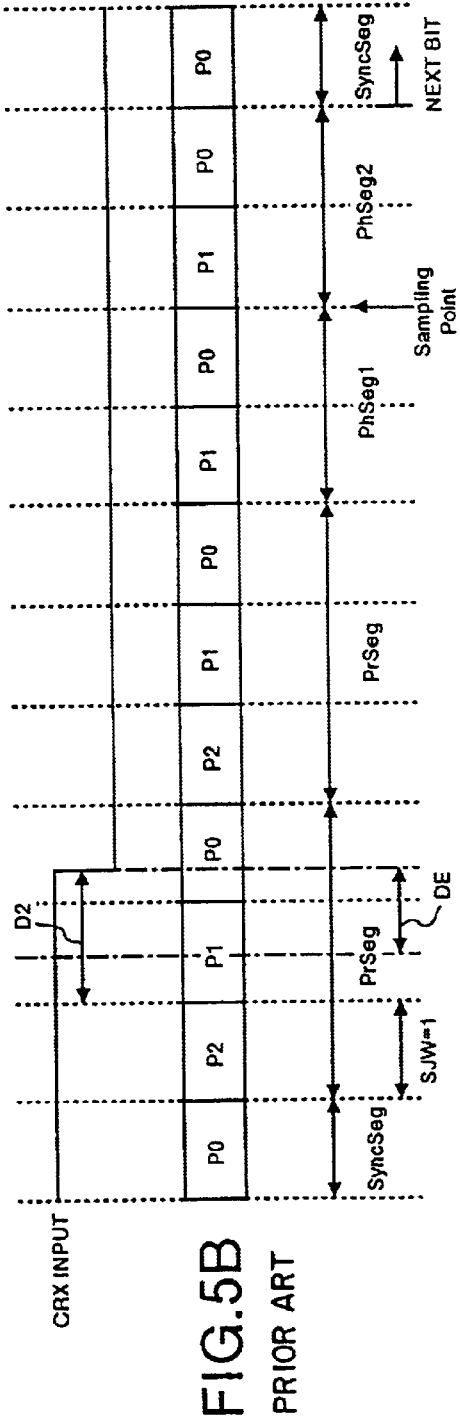

Next, the CAN controller and the one-chip computer having the CAN controller built-in according to a fourth embodiment of the present invention will be explained. Especially, the CAN controller and the one-chip computer having the CAN controller built-in according to the fourth embodiment of the present invention are each assumed to be the one that is equipped with a plurality of CAN modules. FIG. 4 is a block diagram illustrating a schematic construction of a part of the interior of the CAN controller according to the fourth embodiment.

Especially, FIG. 4 illustrates a portion of the internal structure of the CAN controller, which is comprised of a CAN module 46 that is discriminated as a first channel, a CAN module 47 that is discriminated as a second channel, a CTX0 terminal 41 and CRX0 input terminal 42 of the CAN module 46, and a CTX1 terminal 43 and CRX1 input terminal 44 of the CAN module 47. Other conventional circuits that are loaded on the CAN controller are omitted from FIG. 4.

Here, the CTX0 terminal 41 and CTX1 terminal 43 are respectively the ones that are used to output desired messages, with respect to which suitable processing have been performed by the CAN modules 46 and 47, to the not illustrated CAN buses. Also, the CRX0 terminal 42 and CRX1 terminal 44 are respectively the terminals that are used to input serial signals to the CAN modules 46 and 47 via the CAN buses.

The characteristic feature of the CAN controller according to this fourth embodiment is that, as illustrated in FIG. 4, between the CAN modules 46 and 47 and the four terminals of the CTX0 terminal 41, CRX0 terminal 42, CTX1 terminal 43 and CTX1 terminal 44, there is provided an internal communication circuit 45 that is so connected as to enable CAN communication to be directly performed between the CAN module 46 and the CAN module 47.

As shown in FIG. 4, an internal communication circuit 45 is constructed of a NAND gate G41, an inverter G42, and buffers G43 and G44. One input terminal of the NAND gate G41 is connected to the CTX0 terminal 41 and the other input terminal thereof is connected to the CTX1 terminal 43. Output terminal of the NAND gate G41 is connected to an input terminal of the inverter G42. An AND gate is constituted with the NAND gate G41 and the inverter G42.

Output terminal of the inverter G42 is connected to the input terminals of the buffers G43 and G44. The buffer G43 inputs the signal that is output from the inverter G42 to the CAN module 46 as a CRX0 input signal. The buffer G44 inputs the signal that is output from the inverter G42 to the CAN module 47 as a CRX1 input signal.

Here, the buffers G43 and G44 are each a three-state buffer and, by having a control signal D input thereto, can control whether or not the signal that is output from the inverter G42 is to be input to the respective CAN modules.

Next, the operation of this internal communication circuit 45 will be explained. First, upon input of a signal having a logical level of "L" as the control signal D, the output terminals of the buffers G43 and G44 are each brought to a state of high impedance. Therefore, the output of the inverter G42 is not input to the CAN modules 46 and 47. Namely, as in the case of the ordinary operation, the CAN modules 46 and 47 function respectively independently.

On the other hand, upon input of a signal having a logical level of "H" as the control signal D, the buffers G43 and G44 become active, with the result that the output of the inverter G42 is input to each of the CAN modules 46 and 47. Namely, the result of the AND operation that is performed between the signal level indicated by the CTX0 output signal that is output from the CAN module 46 and the signal level indicated by the CTX1 output signal that is output from the CAN module 47 is directly input to the CAN module 46 as the CRX0 input and also input to the CAN module 47 as the CRX1 input.

This means that, by inputting the signal having a logical level of "H" as the control signal D when performing the operation test, it is possible to execute the test on the CAN modules 46 and 47 inside the CAN controller without the use of the CAN buses as an intermediary.

Incidentally, the internal communication circuit 45 illustrated in FIG. 4 is the circuit that is so constructed in a case where each CAN module is designed by setting the dominant level based on the CAN protocol to be a logical level of "L". In a case where each CAN module is designed by setting the dominant level based on the CAN protocol to be a logical level of "H", it is necessary to use a NOR gate in place of the NAND gate G41.

Further, the internal communication circuit 45 such as that illustrated in FIG. 4 can be similarly applied also to the CAN controller equipped with three or more CAN modules or the one-chip computer having such CAN controller built-in.

As explained above, in the CAN controller and the one-chip computer having the CAN controller built-in according to the fourth embodiment, there is provided, between a plurality of the CAN modules (46, 47) and the CTX terminals and CRX terminals (the CTX0 terminal and CRX0 terminal, and the CTX1 terminal and CRX1 terminal) of the respective CAN modules, the internal communication circuit 45 wherein the signals that have been generated according to the CTX outputs that are output to the CTX terminals (CTX0 terminal, CTX1 terminal) of the respective CAN modules are directly input to the CRX terminals (CRX0 terminal, CRX1 terminal) of the respective CAN modules. Therefore, when performing the operation test of each CAN module, it is possible to connect the respective CAN modules to each other within the CAN controller by inputting the control signal D indicating the test mode to this internal communication circuit 45, and it is thereby possible to test a plurality of the CAN modules simultaneously with a high speed.

Incidentally, in the first to fourth embodiments that are explained above, the control signals A to D can be input to the relevant circuit from a test mode input terminal that is provided on a chip package equipped with the CAN controller. Further, it is possible to use one of the signals output from the decoder as the control signal A to D according to the combination of signals that are input to several chip mode input terminals which the chip package is previously equipped with.

Further, in the above-described formof one-chip computer, it is also possible to select the level of the control signal A to D in terms of a software in the control program that operates on a CPU and thereby make a transfer of the mode to the test mode. In this case, it is possible to cope with this, for example, by providing a register for use on the control signal A to D and input the value stored in this register as the control signal A to D.

As described above, according to this invention, there is provided the control unit that can control whether or not the edge detection signal of the serial signal that is detected by the edge detection unit is to be input to the re-synchronization unit for causing a re-synchronizing function prepared in accordance with a CAN protocol to be executed. Therefore, it is possible to make ineffective the re-synchronizing function performed by the re-synchronization unit according to the input of the control signal that performs this control operation. As a result, the state of synchronization of the serial signal that occurs due to the re-synchronizing function ceases to fluctuate. As a result, it is possible to stably confirm the operation of various functions of the CAN module other than the re-synchronizing function.

According to the next invention, when the control unit inputs the control signal indicating a test mode, the edge detection signal that is output from the edge detection unit is not output to the re-synchronization unit. Therefore, when performing the operation test of the CAN controller, it is possible to make the re-synchronizing function ineffective. As a result, the state of synchronization of the serial signal that occurs due to the re-synchronizIng function ceases to fluctuate. As a result, it is possible to stably perform the operation test of the CAN module with a high speed.

According to the next invention, the control unit is constructed of only one NAND gate and only one inverter. Therefore, it is possible to simplify the circuit construction. It is thereby possible to achieve the reduction in size of the CAN controller and the reduction in cost.

According to the next invention, there is provided between the CAN module and the signal processing circuit for performing various processing such as elimination of noises with respect to the serial signal input via the CAN buses the selecting unit that inputs the signal (first signal) that is output from the signal processing unit and the serial signal (second signal) that has bypassed the signal processing circuit, and that inputs to the CAN module either one of the first signal and the second signal. It is therefore possible to select the serial signal input to the CAN module according to the input of the control signal for performing such selection. Therefore, the effect of the propagation delay that occurs due to the passage of the second signal through the signal processing circuit is prevented from being extended to the CAN module as in the case of the first signal. Namely, the re-synchronizing function of the CAN module is prevented from being executed due to this propagation delay. As a result, it is possible to stably confirm the operation of the various functions of the CAN module.

According to the next invention, when the selecting unit inputs the control signal indicating a test mode, it is possible to input the serial signal that does not pass through the signal processing unit, directly from the CAN buses. Therefore, when performing the operation test of the CAN controller, it is possible to decrease the propagation delay of the serial signal that is caused to occur due to the signal processing unit. As a result, the state of synchronization of the serial signal that occurs due to the re-synchronizing function ceases to fluctuate. As a result, it is possible to stably perform the operation test of the CAN module with a high speed.

According to the next invention, the selecting unit is constructed of only one inverter and only two clocked inverters. It is therefore possible to simplify the circuit construction. As a result, it is thereby possible to achieve the reduction in size of the CAN controller and the reduction in cost.

According to the next invention, there is provided the clock switching unit that as the clock for synchronizing the serial signal that is input from the CRX terminal sets either one of the first clock signal and a second clock signal whose frequency is smaller than that of the first clock signal and that newly inputs the resulting synchronized as a serial signal to the CAN module. Therefore, especially by setting as the second clock signal the clock signal that is slow enough to absorb the propagation delay that occurs due to the passage of the serial signal through various circuits that are disposed before the stage of the clock switching unit, it is possible to prevent the fluctuation of the propagation delay due to the testing conditions from being extended to the CAN module. It is thereby possible to stably confirm the operation of various functions of the CAN module.

According to the next invention, when the clock switching unit inputs the control signal indicating a test mode, it is possible to prevent the propagation delay fluctuating depending on the testing conditions from having an adverse effect on the CAN controller according to the second clock signal whose frequency is smaller than that of the first clock signal that is used in the ordinary operation. As a result, even under the different testing conditions, it is possible to suppress a fluctuation in the synchronization state of the serial signal that occurs due to the re-synchronizing function. Therefore, it is possible to stably perform the operation test of the CAN module with a high speed.

According to the next invention, the selecting unit is constructed only of one inverter, two clocked inverters, and one D flip flop. Therefore, it is possible to simplify the circuit construction. As a result, it is thereby possible to achieve the reduction in size of the CAN controller and the reduction in cost.

According to the next invention, there is provided the internal communication unit that, between at least two CAN modules of the plurality of CAN modules, generates signals corresponding to serial signals input from a CAN bus on the basis of the serial signals that are output from the respective CAN modules to the CAN bus, and that inputs the generated signal to the respective CAN modules as the serial signal that is input from the CAN buses. Therefore, it is possible to perform the communication between the CAN modules in the interior of the CAN controller without using the CAN buses as an intermediary. It is thereby possible to simultaneously confirm the operation of various functions of the plurality of CAN modules with a high speed.

According to the next invention, when the internal communication unit inputs the control signal indicating a test mode, it is possible to perform the communication between the CAN modules in the interior of the CAN controller without using the CAN buses as an intermediary. Therefore, when performing the operation test of the CAN controller, it is possible, in place of the serial signal that in the ordinary operation is input from the CAN buses, to input the signal that is generated according to the respective serial signals output from the respective CAN modules, to these respective CAN modules. As a result, it is possible to test the plurality of CAN modules simultaneously with a high speed.

According to the next invention, the internal communication unit is constructed of one NAND gate, one inverter, and three-state buffer. This is for the purpose of, with respect to the CAN controller whose dominant level based on the CAN protocol is set as a logical level of "L", performing the communication between the CAN modules inside this CAN controller according to the control signal. Therefore, it is possible to simplify the circuit construction and hence achieve the reduction in size and in cost of the CAN controller.

According to the next invention, the internal communication unit is constructed of one NOR gate, one inverter, and three-state buffer. This is for the purpose of, with respect to the CAN controller whose dominant level based on the CAN protocol is set as a logical level of "H", performing the communication between the CAN modules inside this CAN controller according to the control signal. Therefore, it is possible to simplify the circuit construction and hence achieve the reduction in size and in cost of the CAN controller.

According to the next invention, in the one-chip computer that has built-in the CAN controller according to any one of the above-described inventions by the CAN controller being added as an on-chip form, also, the effect that is brought about by this CAN controller can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A CAN controller comprising:
   an edge detection unit for detecting an edge of a serial signal that is input from a CAN (Controller Area Network) serial input terminal;
   a control unit for receiving an edge detection signal that is output from said edge detection unit and controlling according to an input of a control signal whether or not the edge detection signal that is input thereto is to be output therefrom; and a re-synchronization unit for causing a re-synchronizing function, prepared in accordance with a CAN protocol, to be executed according to an output signal from said control unit.

2. The CAN controller according to claim 1, wherein said control unit does not output the edge detection signal input thereto when the control signal indicates a test mode.

3. The CAN controller according to claim 1, wherein said control unit is constructed of a NAND gate for having the edge detection signal input to one input terminal thereof and having the control signal input to the other input terminal thereof, and an inverter for inputting an output signal of the NAND gate and causing an inverted signal of the output signal to be input to said re-synchronization unit.

* * * * *